United States Patent [19]

Maycock

[11] 4,352,420
[45] Oct. 5, 1982

[54] FRICTION CLUTCH DRIVEN PLATE

[75] Inventor: Ian C. Maycock, Leamington Spa, England

[73] Assignee: Automotive Products Limited, Leamington Spa, England

[21] Appl. No.: 147,186

[22] Filed: May 6, 1980

[30] Foreign Application Priority Data

May 10, 1979 [GB] United Kingdom ............... 7916306

[51] Int. Cl.³ .............................................. F16D 3/66
[52] U.S. Cl. .................................. 192/106.2; 29/525; 464/68
[58] Field of Search .................. 192/106.1, 106.2; 64/27 C, 27 F, 27 S; 29/525

[56] References Cited

U.S. PATENT DOCUMENTS

| 2,880,641 | 4/1959 | Sislik | 29/525 |
| 3,300,853 | 1/1967 | Gabbert | 29/525 X |
| 3,428,155 | 2/1969 | Binder et al. | 192/106.1 |
| 3,556,273 | 1/1971 | Maucher | 192/106.2 |
| 3,863,747 | 2/1975 | Werner | 192/106.2 |
| 3,938,635 | 2/1976 | Davies et al. | 192/106.2 |
| 4,000,794 | 1/1977 | Worner | 192/106.2 |
| 4,044,874 | 8/1977 | Worner | 192/106.2 |
| 4,177,888 | 12/1979 | Arrowsmith | 64/27 C |

FOREIGN PATENT DOCUMENTS 2296790 7/1976 France ............... 192/106.2

Primary Examiner—George H. Krizmanich
Attorney, Agent, or Firm—Kemon & Estabrook

[57] ABSTRACT

A motor vehicle clutch driven plate having a flanged hub comprising a pressed annular metal plate having a central cylindrical neck and a central insert. The insert has inner splines for mating with a shaft and outer teeth for engagement in the neck. The insert is a force fit into the neck so that engagement of the teeth with the internal surface of the neck holds the insert in its operative position relative to the plate which then constitutes the hub flange.

Such a construction allows a large number of inserts having different internal splines to be used with a single metal plate.

7 Claims, 4 Drawing Figures

FRICTION CLUTCH DRIVEN PLATE

This invention relates to friction clutch driven plates, and in particular but not exclusively to driven plates for automobile clutches.

A typical driven plate comprises a flanged hub having a friction facing carrier capable of limited rotational movement about the hub, and springs acting between the hub flange and the facing carrier to resist rotational movement.

The flanged hub is expensive to manufacture and may be produced by drop forging and subsequent machining, or by fabrication by for example forcing a splined annular plate onto a forged and machined hub centre so as to cut co-operating splines on the hub centre.

This invention seeks to provide a driven plate construction that is cheap to manufacture.

Accordingly there is provided a clutch driven plate having a flanged hub comprising an annular metal plate having a central cylindrical neck and an annular central insert having inner splines for mating with a shaft and outer teeth for engagement in the neck, the insert being a force fit into the neck to hold the insert against axial movement and by engagement of the teeth in the neck hold the insert against rotational movement relative to the plate which then constitutes the hub flange.

Conveniently the internal surface of the neck is toothed to interengage with the outer teeth on the insert.

A major advantage of this type of construction is that for a single size pressed annular metal plate flange with its central neck, a whole range of inserts can be manufactured having, for example, different splines for engagement with different gearbox input shafts. Further the insert can be forced through the neck as is required so that the axial position of the flange relative to the hub centre can be changed at will.

Also according to this invention there is provided a method of manufacture of a clutch driven plate having a flanged hub, and including the steps of forming an annular sheet metal plate with an internally splined central cylindrical neck, and forcing an annular central insert having inner and outer splines into the cylindrical neck, the outer splines on the insert engaging the internal surface on the neck to lock the insert against both axial and rotational movement relative to the flange.

The invention will be described by way of example and with reference to the accompanying drawings in which.

Figure 1:
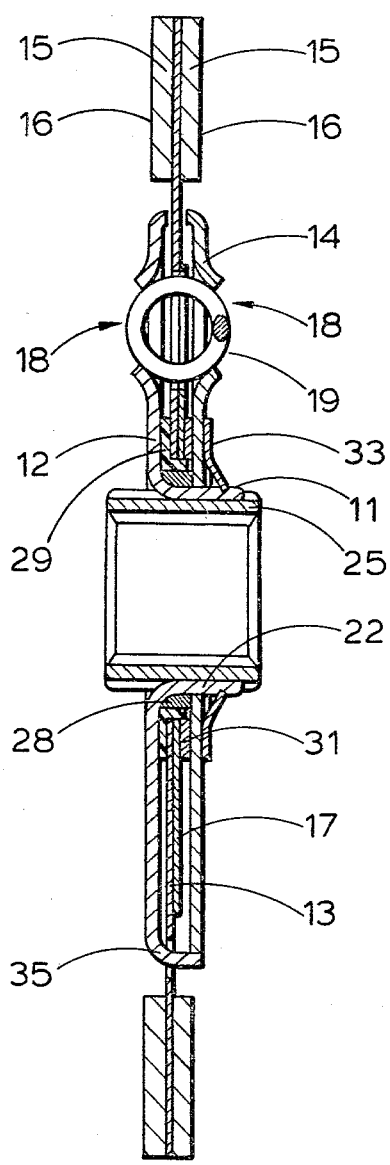
FIG. 1 is a cross-section through a driven plate according to this invention.
Figure 2:
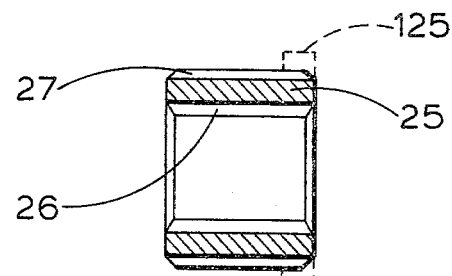
FIG. 2 shows an insert as utilised in FIG. 1.
Figure 3:
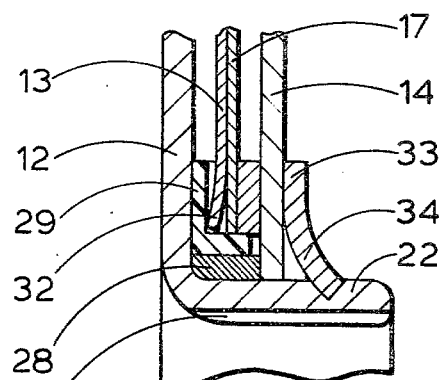
FIG. 3 shows in detail the friction damper utilised in FIG. 1.
Figure 4:
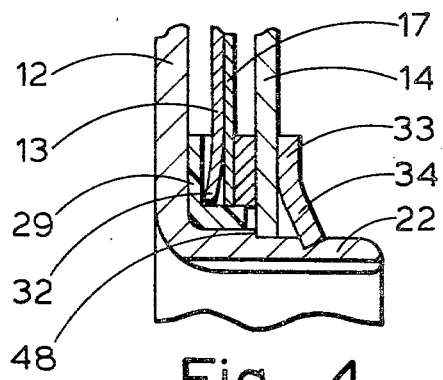
FIG. 4 shows a modified friction damper.

With reference to FIG. 1, FIG. 2 and FIG. 3 the clutch driven plate comprises a hub 11 having an annular flange 12 thereon. A co-axial friction facing carrier plate 13 is arranged to one side of the flange 12 and is capable of limited angular movement relative to the hub 11. The facing carrier plate 13 is axially sandwiched between the flange 12 and a retainer plate 14, which is rotationally fast relative to the flange 12, (axially with respect to the axis of rotation of the driven plate).

The outer peripheral margin of the flange 12 has a number of axial lugs 35 formed thereon. These lugs 35 engage with co-operating slots or apertures in the retainer plate 14, thereby locking the retainer plate rotationally fast with the flange.

A pair of friction facings 15 are disposed one each side of the carrier plate 13 which is made from spring steel and its outer margin is formed so as to provide axial cushioning between the two friction facings 15 when the opposed friction faces 16 thereof are put under a clamping load.

The inner margin of the carrier plate 13 is reinforced by an annular support plate 17 secured thereto. The flange 12, retainer plate 14, carrier plate 13 and support plate 17 each have a circumferentially spaced series of aligned apertures 18 therein, which house tangentially aligned torsion damping springs 19, that act to oppose relative rotational movement between the hub 11 and the facing carrier 13.

The hub 11 comprises a splined insert 25 and the annular metal plate which constitutes the flange 12. The metal plate 12 is press formed and has a central cylindrical neck 22 which has internal teeth 21 on its inner surface. The insert 25 is cylindrical in shape and has inner splines 26 for mating with the splines on a gearbox input shaft (not shown) and outer teeth 27 for engagement with the internal teeth 21 on the inner surface of the neck 22. The insert 25, is sintered, extruded or rolled bar and is a force fit into the neck 22 of the plate 12 so that the teeth 27 and 21 interlock and the insert 25 becomes both rotationally and axially locked relative to the plate 12. The insert 25 is forced into the plate neck 22 until the required axial relative position between the now formed flange 12 and a datum end face of the insert 25 is reached. One means of achieving this easily is to use a headed bush type insert with the head 125 abutting the hub 11 when the required position is reached. This is shown in dotted lines in FIG. 2.

The carrier plate 13 and its reinforcing plate 17 are then placed over the neck 22 which projects through the centre of the two plates 13 and 17 and the retainer plate 14 is then placed over the neck 22 so as to sandwich the carrier plate between itself and the flange 12. The retainer plate 14 is spaced from flange 12 by a spacer ring 28 which surrounds the neck 22 and is disposed in the centre of the carrier plate.

A flanged nylon bush 29 has an axial cylindrical portion arranged between the inner peripheries of the two plates 13 and 17 and the spacer ring 28, and a radial flange separating the hub flange 12 from the carrier plate 13. The nylon bush thus prevents direct rubbing contact between the hub 11 and the friction facing carrier plate 13. A friction washer 31 is located between the reinforcing plate 17 and the retainer plate 14 to provide friction damping for the relative rotational movement between the hub 11 and the facing carrier 13. The radially inner peripheral margin of the carrier plate 13 is formed to provide a spring 32 (see FIG. 3) that reacts against the flange 12 to bias the friction washer 31 against the retainer plate 14. Thus the inner peripheral margin of the carrier plate 13 acts as a friction damper spring.

The retainer plate 14 is locked in position against the spacer ring 28 by an annular spring ring 33 forced axially over the neck 22. The spring ring 33 is provided with internal barbs 34 which dig into the neck 22 to oppose axial withdrawal of the spring ring and hold it in its forced-on axial position clamping the driven plate assembly together. The outer surface of the neck may have a groove thereon into which the barbs 34 may engage.

I claim:

1. A friction clutch driven plate having a hub with a circumferential flange thereon, said hub comprising:
   an annular metal plate having a central cylindrical neck, and an annular central insert having inner splines for mating with a shaft and outer teeth for engagement on the neck, the insert being a force fit into the neck to hold the insert against axial movement and by engagement of its outer teeth on the neck to hold the insert against rotational movement relative to the plate, said plate then constituting a hub flange;
   an annular friction facing carrier co-axial with the hub and arranged to one side of the flange;
   a retainer plate rotationally fast with the flange and arranged on the opposite side of the carrier to said flange so as to sandwich the carrier therebetween;
   and a spring ring forced over said neck to hold the retainer axially in position.

2. A clutch driven plate as claimed in claim 1, wherein the neck is internally toothed and the outer teeth on the insert interengage with the teeth on the neck to rotationally lock the insert relative to the flange.

3. A clutch driven plate as claimed in claim 2, wherein the insert is headed to locate, by abutment of the head against the neck, the relative axial positions of the insert and flange formed by the plate.

4. A clutch driven plate as claimed in claim 1, wherein the spring ring has internally projecting barbs that engage the neck to oppose axial withdrawal of the retainer plate.

5. A driven plate as claimed in claim 1, wherein the carrier plate is made from spring steel and its radially inner peripheral margin is formed into a friction damper spring to bias the carrier plate towards the retainer plate.

6. A driven plate as claimed in claim 5, wherein the inner margin of the carrier plate is supported by an annular reinforcing plate.

7. A driven plate as claimed in claim 1, wherein the hub flange and retainer plate are rotationally locked together by lugs on one of said flange and plate, cooperating with other of said flange and plate.

* * * * *